US009329779B2

(12) United States Patent
Shimazu et al.

(10) Patent No.: US 9,329,779 B2
(45) Date of Patent: May 3, 2016

(54) DEVICE, METHOD, AND STORAGE MEDIUM STORING PROGRAM

(71) Applicant: KYOCERA CORPORATION, Kyoto (JP)

(72) Inventors: Tomohiro Shimazu, Osaka (JP); Kazuya Takemoto, Kyotanabe (JP); Naoyuki Tamai, Amagasaki (JP); Sanae Nishio, Yokohama (JP); Katsuaki Oonishi, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 334 days.

(21) Appl. No.: 13/630,463

(22) Filed: Sep. 28, 2012

(65) Prior Publication Data

US 2013/0082959 A1 Apr. 4, 2013

(30) Foreign Application Priority Data

Sep. 30, 2011 (JP) .................................. 2011-216848
Sep. 27, 2012 (JP) .................................. 2012-215178

(51) Int. Cl.
| | | |
|---|---|---|
| *G06F 3/048* | (2013.01) | |
| *G06F 3/0488* | (2013.01) | |
| *G06F 3/0484* | (2013.01) | |
| *H04M 1/2745* | (2006.01) | |
| *H04M 1/725* | (2006.01) | |
| *G06F 3/0481* | (2013.01) | |
| *G06F 1/16* | (2006.01) | |

(52) U.S. Cl.
CPC ........ *G06F 3/04886* (2013.01); *G06F 3/04842* (2013.01); *H04M 1/274508* (2013.01); *H04M 1/274516* (2013.01); *G06F 1/1613* (2013.01); *G06F 3/0481* (2013.01); *H04M 1/72583* (2013.01)

(58) Field of Classification Search
CPC ............ G06F 3/04842; G06F 3/04886; G06F 3/0481; G06F 1/1613; H04M 1/72583
USPC ................... 345/169, 173; 715/702, 810, 864
See application file for complete search history.

(56) References Cited

U.S. PATENT DOCUMENTS

| | | | |
|---|---|---|---|
| 6,847,387 B2 * | 1/2005 | Roth | ............................... 715/811 |
| 2001/0019338 A1 * | 9/2001 | Roth | ...................... G06F 3/0482 715/811 |
| 2002/0112237 A1 * | 8/2002 | Kelts | ...................... G06F 3/0481 725/39 |
| 2005/0154798 A1 * | 7/2005 | Nurmi | ................... G06F 1/1626 710/1 |

(Continued)

FOREIGN PATENT DOCUMENTS

| | | |
|---|---|---|
| JP | 2011-66850 A | 3/2011 |
| WO | 2008/086302 A1 | 7/2008 |
| WO | 2010/144201 A2 | 12/2010 |

OTHER PUBLICATIONS

Office Action mailed Feb. 3, 2015, corresponding to Japanese patent application No. 2012-215178, for which an explanation of relevance is attached.

*Primary Examiner* — Michael J Eurice
(74) *Attorney, Agent, or Firm* — Hauptman Ham, LLP

(57) ABSTRACT

According to an aspect, a device includes a touch screen display and a controller. The touch screen display displays a home screen. The controller displays information for specifying a person in a first area of the home screen, and displays a list of information for specifying communication services used by a person specified by the information displayed in the first area in a second area of the home screen.

16 Claims, 13 Drawing Sheets

(56) References Cited

U.S. PATENT DOCUMENTS

| | | | |
|---|---|---|---|
| 2005/0216867 A1* | 9/2005 | Marvit | G06F 1/1613 715/863 |
| 2007/0083827 A1* | 4/2007 | Scott | G06F 9/4443 715/811 |
| 2007/0132789 A1* | 6/2007 | Ording | G06F 3/0485 345/684 |
| 2007/0174782 A1* | 7/2007 | Russo | G06F 3/04817 715/781 |
| 2008/0012825 A1* | 1/2008 | Robertson | H04M 1/27455 345/156 |
| 2008/0045189 A1* | 2/2008 | Kim | G06F 21/6218 455/414.2 |
| 2008/0086302 A1* | 4/2008 | Krishnan | G10L 19/005 704/225 |
| 2008/0094368 A1* | 4/2008 | Ording | G06F 3/0488 345/173 |
| 2008/0165152 A1* | 7/2008 | Forstall | G06F 1/1626 345/173 |
| 2008/0165160 A1* | 7/2008 | Kocienda | G06F 3/04883 345/175 |
| 2008/0174570 A1* | 7/2008 | Jobs | G06F 3/0488 345/173 |
| 2008/0318616 A1* | 12/2008 | Chipalkatti | H04W 12/08 455/550.1 |
| 2008/0320419 A1* | 12/2008 | Matas | G01C 21/20 715/863 |
| 2009/0007017 A1* | 1/2009 | Anzures | G06F 3/04883 715/835 |
| 2009/0172531 A1* | 7/2009 | Chen | G06F 3/04886 715/702 |
| 2010/0070926 A1* | 3/2010 | Abanami | G06F 1/1626 715/835 |
| 2010/0088639 A1* | 4/2010 | Yach | G06F 1/1626 715/825 |
| 2010/0156808 A1* | 6/2010 | Stallings | G06F 3/04886 345/173 |
| 2010/0293543 A1* | 11/2010 | Erhart | H04W 8/18 718/1 |
| 2010/0309147 A1* | 12/2010 | Fleizach et al. | 345/173 |
| 2010/0309148 A1* | 12/2010 | Fleizach et al. | 345/173 |
| 2010/0313125 A1* | 12/2010 | Fleizach | G06F 3/04883 715/702 |
| 2011/0072361 A1 | 3/2011 | Sakai et al. | |
| 2011/0165841 A1* | 7/2011 | Baek | H04L 67/10 455/41.2 |
| 2011/0167941 A1* | 7/2011 | Helvajian | B81C 1/00634 74/1 R |
| 2011/0181683 A1* | 7/2011 | Nam | H04N 5/44513 348/14.07 |
| 2011/0256907 A1* | 10/2011 | Lee | H04M 1/27455 455/566 |
| 2011/0258559 A1* | 10/2011 | You | G06Q 10/107 715/752 |
| 2011/0304560 A1* | 12/2011 | Dale | G06F 3/04886 345/173 |

* cited by examiner

FIG.6

| ID | FAMILY NAME | GIVEN NAME | IMAGE | SERVICE NAME | SERVICE ID | NOTIFI-CATIONS | LAST USE DATE/TIME |
|---|---|---|---|---|---|---|---|
| P001 | Sasaki | Ichiro | prof001.png | Phone | 999-9999-9999 | 0 | 2011/5/4 18:38 |
| | | | | Email | xxxxx@example1.com | 0 | 2011/7/24 9:56 |
| | | | | F-SNS | yyyyy@example2.com | 3 | 2011/7/26 21:59 |
| | | | | M-SNS | zzzzz@example3.com | 1 | 2011/6/13 22:05 |
| P002 | Hanako | Tanaka | prof002.png | Phone | 999-9999-8888 | 1 | 2011/7/1 15:21 |
| | | | | Email | aaaaa@example4.com | 2 | 2011/7/26 19:33 |
| | | | | F-SNS | bbbbb@example5.com | 0 | 2011/7/3 19:15 |
| | | | | T-SNS | ccccc@example6.com | 5 | 2011/7/26 22:16 |
| | | | | D-SNS | ddddd@example7.com | 0 | 2011/2/4 21:26 |
| | | | | M-SNS | eeeee@example8.com | 0 | 2011/6/17 23:31 |
| P003 | Suzuki | Taro | prof003.png | Phone | 999-9999-7777 | 3 | 2011/7/25 15:38 |
| | | | | Email | nnnnn@example1.com | 0 | 2011/7/25 15:41 |
| ... | ... | ... | ... | ... | ... | | |

9X

| GROUP NUMBER | GROUP NAME | MEMBER NUMBER | ID |
|---|---|---|---|
| 1 | FRIENDS | 1 | P002 |
| | | 2 | P001 |
| | | ... | ... |
| 2 | BUSINESS | ... | ... |
| ... | ... | ... | ... |

9Y

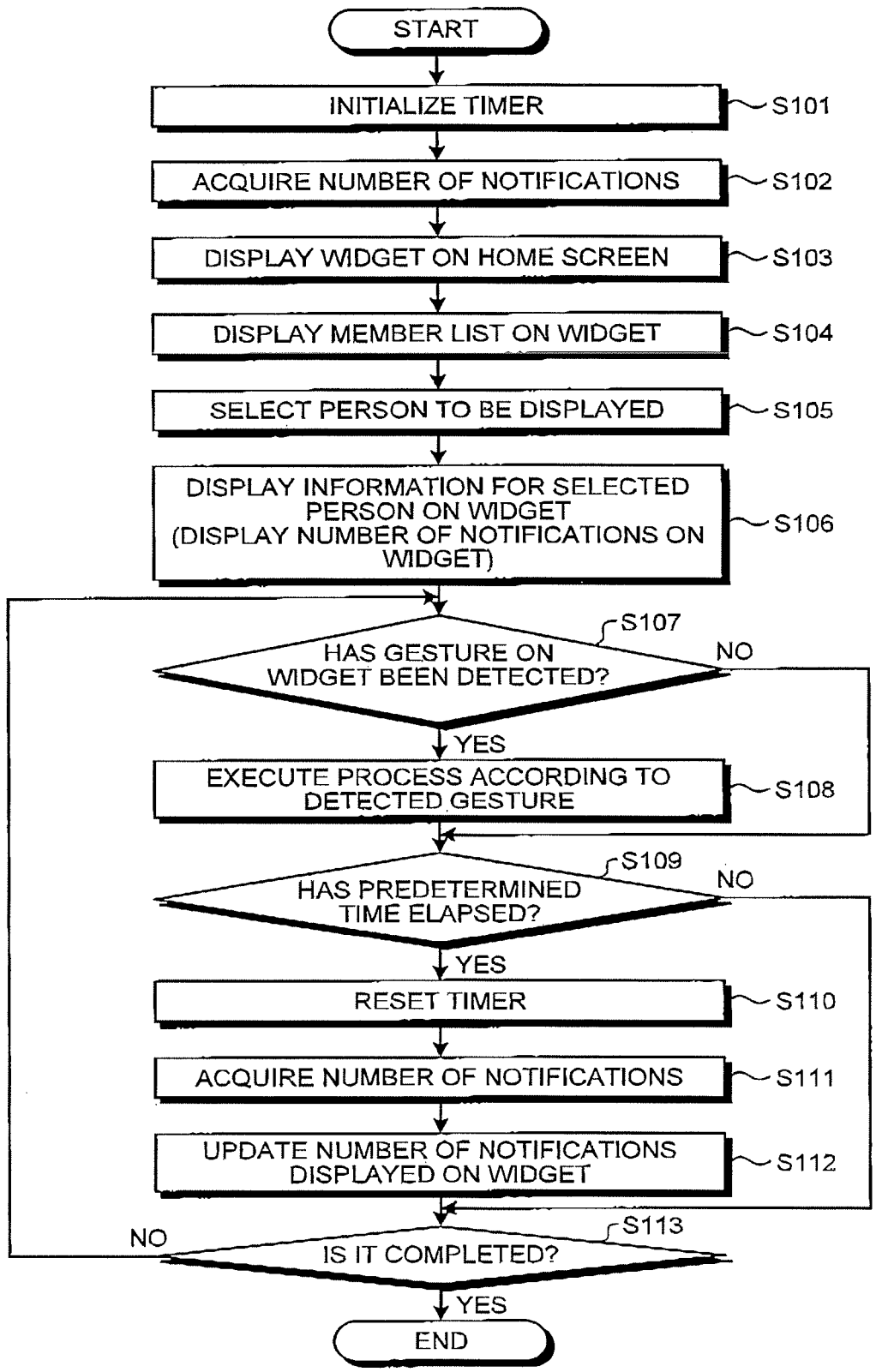

DEVICE, METHOD, AND STORAGE MEDIUM STORING PROGRAM

CROSS-REFERENCE TO RELATED APPLICATIONS

This application claims priority from Japanese Application No. 2011-216848, filed on Sep. 30, 2011, and Japanese Application No. 2012-215178, filed on Sep. 27, 2012, the contents of which are incorporated by reference herein in their entireties.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of touch screen devices is used for accessing various communication service. Therefore, there is a need for a device, a method, and a program that allow the user to easily access communication service.

SUMMARY

According to an aspect, a device includes a touch screen display and a controller. The touch screen display displays a home screen. The controller displays information for specifying a person in a first area of the home screen, and displays a list of information for specifying communication services used by a person specified by the information displayed in the first area in a second area of the home screen.

According to another aspect, a method is for controlling a device including a touch screen display. The method includes: displaying a home screen on the touch screen display; displaying information for specifying a person in a first area of the home screen; and displaying a list of information for specifying communication services used by a person specified by the information displayed in the first area in a second area of the home screen.

According to another aspect, a non-transitory storage medium stores therein a program. When executed by a device including a touch screen display, the program cases the device to execute: displaying a home screen on the touch screen display; displaying information for specifying a person in a first area of the home screen; and displaying a list of information for specifying communication services used by a person specified by the information displayed in the first area in a second area of the home screen.

BRIEF DESCRIPTION OF THE DRAWINGS

FIG. 6 is a diagram illustrating an example of contact data;
FIG. 15 is a flowchart of a procedure for displaying and updating the contact widget.

DETAILED DESCRIPTION

Exemplary embodiments of the present invention will be explained in detail below with reference to the accompanying drawings. A smartphone will be explained below as an example of a device provided with a touch screen display.

Figure 1:
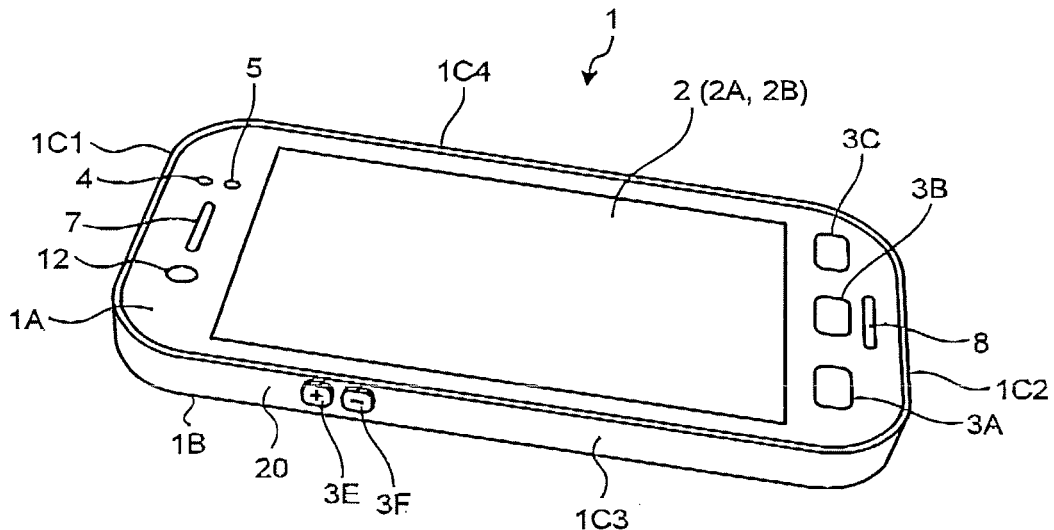
FIG. 1 is a perspective view of a smartphone according to an embodiment.
Figure 2:
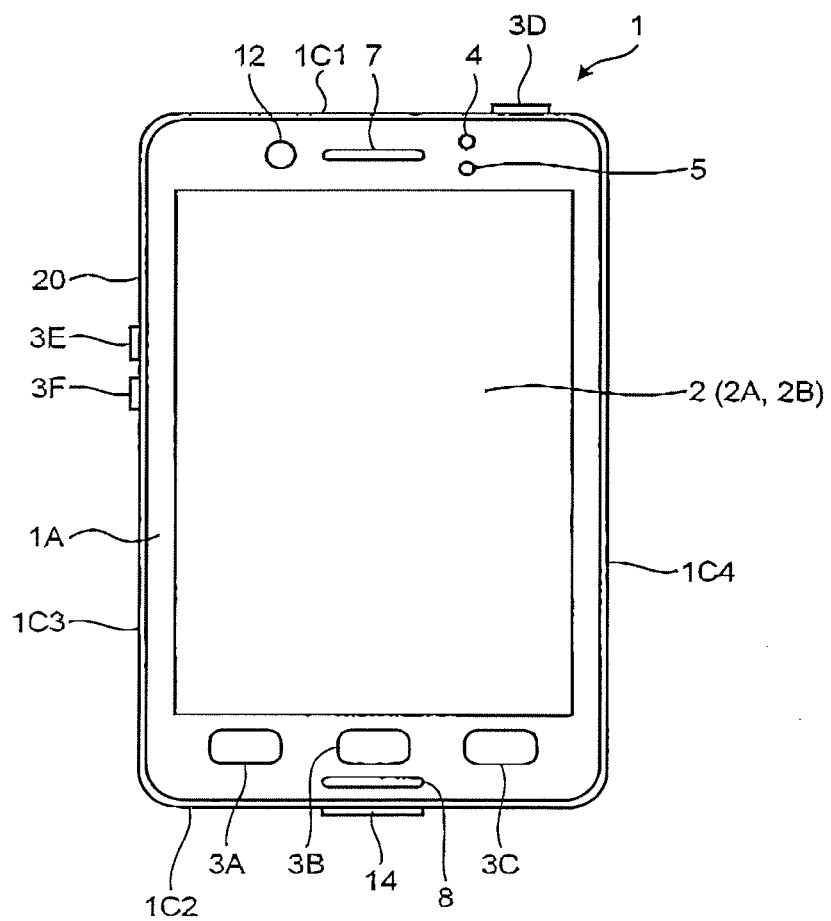
FIG. 2 is a front view of the smartphone.
Figure 3:
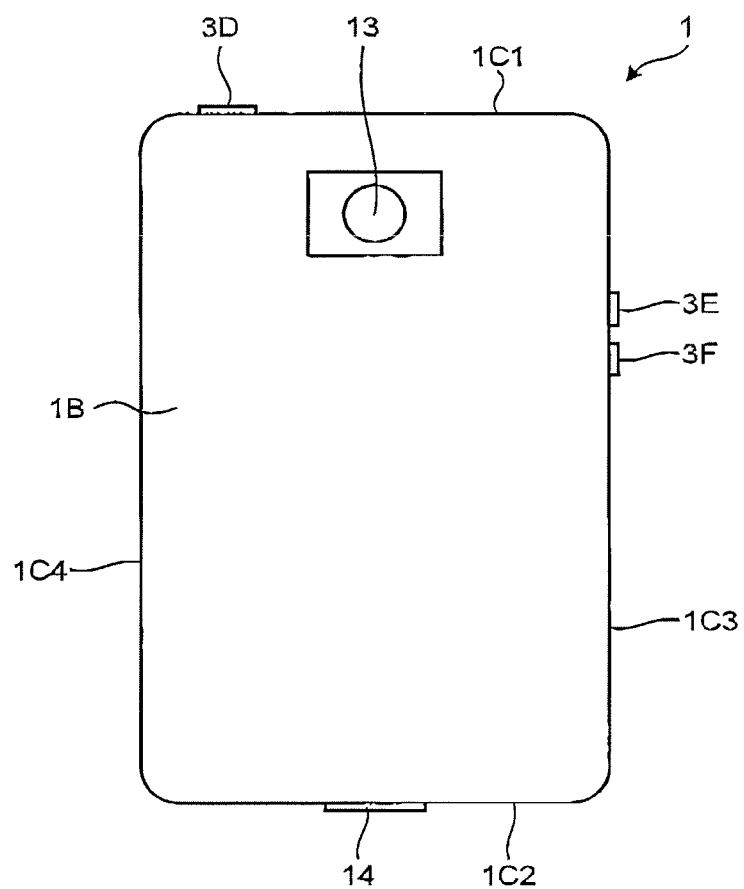
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger, The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
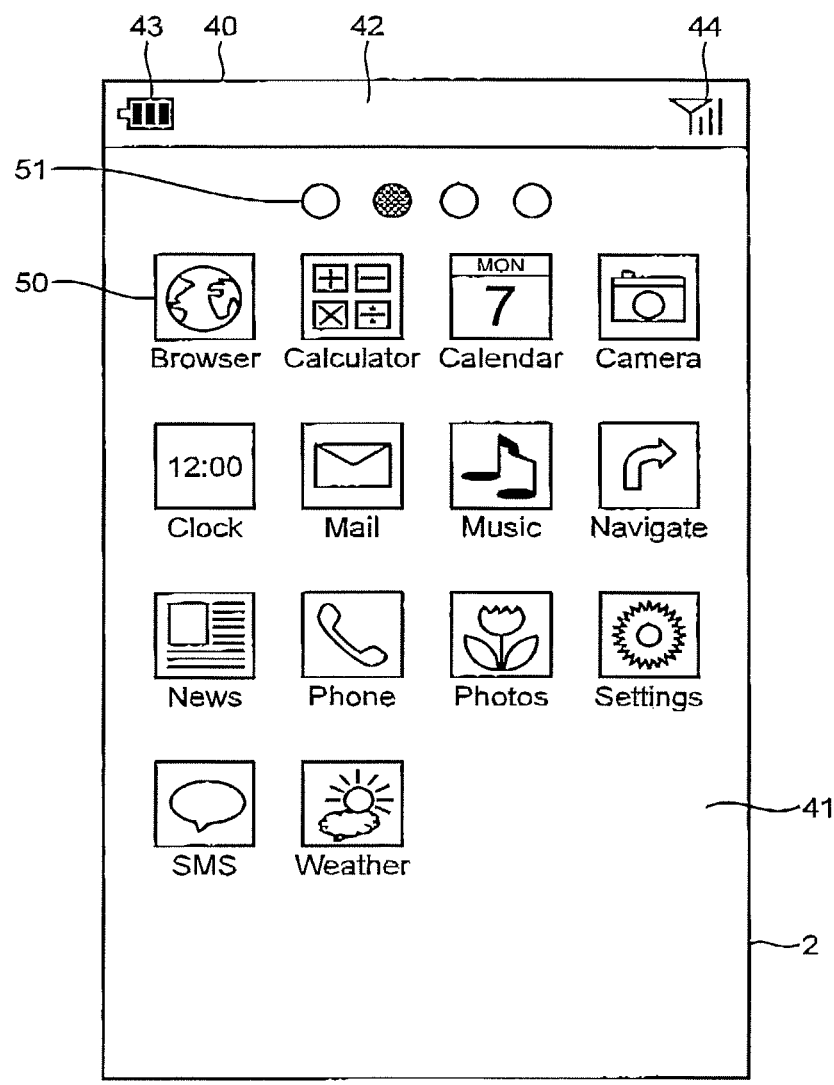
FIG. 4 is a diagram illustrating an example of a home screen.

An example of the screen displayed on the display 2A will be explained below with reference to FIGS. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper. 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator to locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
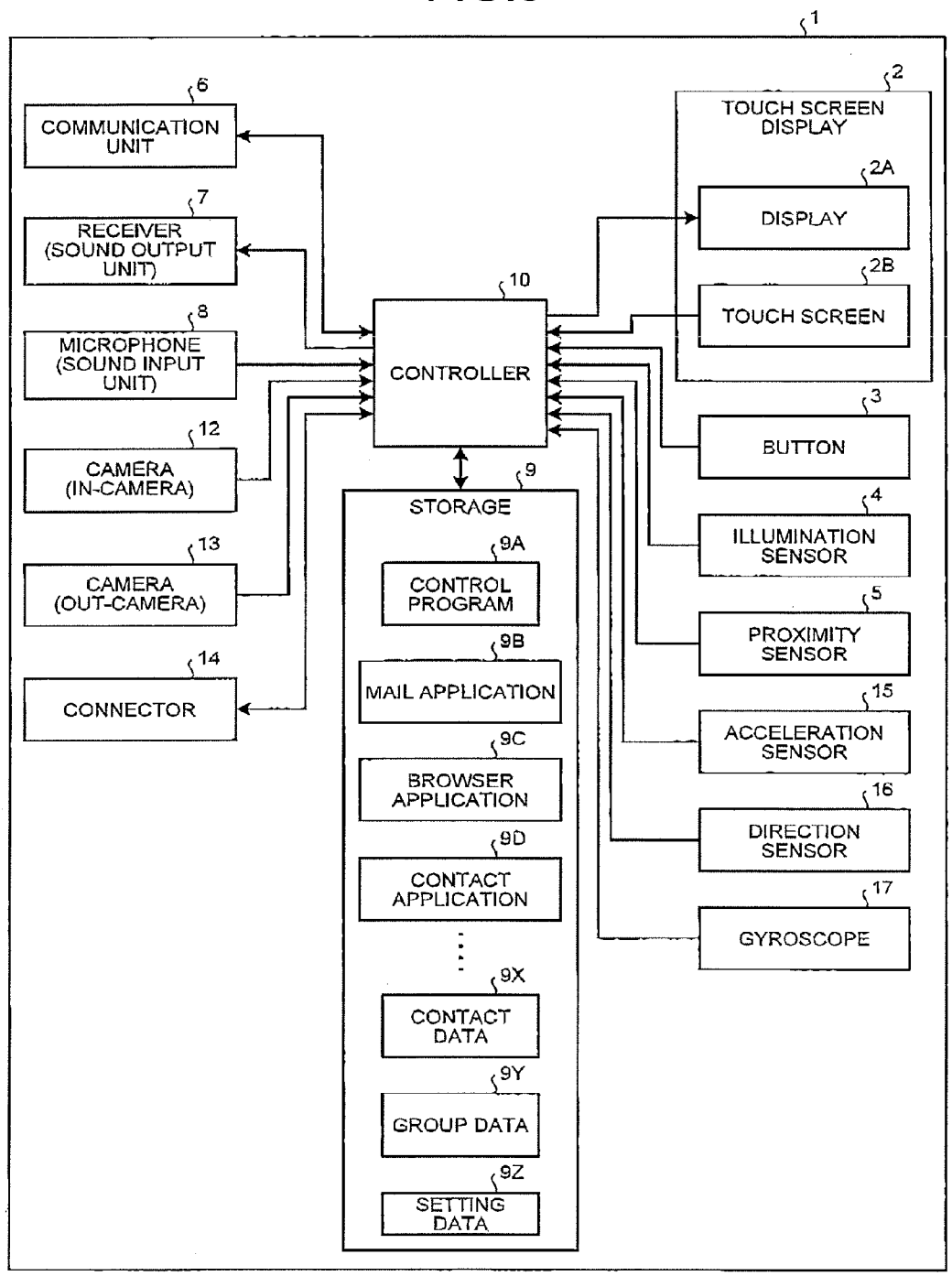
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication, standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound. The receiver 7 is used, for example, to output voice of the other party on the phone. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, a contact application 9D, contact data 9X, group data 9Y, and setting data 9Z. The mail application 9B provides an e-mail function for composing, transmitting, receiving, and displaying e-mail, and the like. The browser application 9C provides a WEB browsing function for displaying WEB pages. The setting data 9Z includes information related to various settings on the operations of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing of information displayed on the display 2A according to a gesture detected through the touch screen 2B. The functions provided by the control program 9A can be used in combination with a function provided by the other program such as the mail application 9B.

The contact application 9D provides a function for managing various pieces of contact information stored in the contact data 9X, that is, provides functions related to, for example, registration, edit, deletion, and display of contact information. The contact application 9D also provides a function for displaying a contact widget on the home screen. The widget is a screen that is arranged on the home screen similarly to the icons. Contents to be displayed on the contact widget are updated periodically or according to a user's operation. The function of displaying the contact widget on the home screen may be implemented by working with the control program 9A.

The contact data 9X holds information used when, the user of the smartphone 1 makes contact with other person or learns of other person's situation. As the information for making contact with other person, the contact data 9X holds, for example, a phone number and an e-mail address of the person. As the information for learning of other person's situation, the contact data 9X holds account information used when the person posts various messages in a communication site such as Social Network Service (SNS). The contact data 9X corresponds to so-called address book data.

An example of the contact data 9X will be explained below with reference to FIG. 6. The contact data 9X illustrated in FIG. 6 has items including ID, Family name, Given name, Image, Service name, Service ID, Notifications, and Last use date/time. The contact data 9X is configured to hold a plurality of combinations of Service name, Service ID, Notifications, and Last use date/time associated with one ID.

The item of ID holds identification numbers for identifying persons. The item of Family name holds family names of persons. The item of Given name holds given names of persons. The item of Image holds information for specifying a profile image such as a face photo or illustration of a person.

The item of Service name holds values indicating types of communication services used by each person. Set in the item of Service name are, for example, "Phone" indicating phone service, "Email" indicating e-mail service, and values of "F-SNS", "T-SNS", "D-SNS", and "M-SNS" indicating SNS run by different businesses. The item of Service ID holds account IDs of persons in a corresponding communication service.

The item of Notifications holds the number of events to be notified to the user of the smartphone 1 among events performed by a corresponding person in a corresponding communication service. For example, when the corresponding communication service is the phone service, the number of calls that have been transmitted from a corresponding person to the user of the smartphone 1 but cannot be responded by the user is set in the item of Notifications. When the corresponding communication service is the e-mail service, the number of unopened e-mails having been transmitted from a corresponding person to the user of the smartphone 1 is set in the item of Notifications.

When the corresponding communication service is SNS, the number of messages that have been posted by a corresponding person but are not read by the user of the smartphone 1 is set in the item of Notifications. The message mentioned here may include a message targeted to unspecified persons, a message targeted to the group the user belongs to, and a message addressed to the user.

The item of Last use date/time holds the date and time when the last event related to the user of the smartphone 1 is performed among events performed by a corresponding person in the corresponding communication service. For example, when the corresponding communication service is the phone service, the date and time of the last outgoing call transmitted from a corresponding person to the user of the smartphone 1 is set in the item of Last use date/time. When the corresponding communication service is the e-mail service, the date and time of the last outgoing mail transmitted from a corresponding person to the user of the smartphone 1 is set in the item of Last use date/time.

When the corresponding communication service is SNS, the date and time of the message last posted by the corresponding person is set in the item of Last use date/time. The message mentioned here may include a message targeted to unspecified persons, a message targeted to the group the user belongs to, and a message addressed to the user.

The contact data 9X may include various pieces of personal information such as an address, a place of work, and a date of birth in addition to the above information. The contact data 9X may hold a plurality of pieces of information related to the same type of communication service associated with one person such as his/her home phone number, work phone number, and mobile phone number.

The group data 9Y holds information related to grouping of persons registered in the contact data 9X. An example of the group data 9Y will be explained with reference to FIG. 7. The group data 9Y illustrated in FIG. 7 has items including Group number, Group name, Member number, and ID. The group data 9Y can hold a plurality of combinations of Member number and ID associated with one Group number.

The item of Group number holds identification numbers for identifying groups. The item of Group name holds names of groups. The item of Member number holds numbers indicating the display order of members included in a group. The item of ID holds identification numbers of members in the contact data 9X. A value of the item of ID in the group data 9Y corresponds to a value of the item of ID in the contact data 9X.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to display the home screen on the display 2A. The controller 10 executes the contact application 9D to display the contact widget on the home screen.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory, storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Functions provided by the contact application 9D will be explained with reference to FIG. 8 to FIG. 14. The functions provided by the contact application 9D include a function for displaying the contact widget on the home screen 40 and a function for updating the contact widget.

Figures 7, 8:
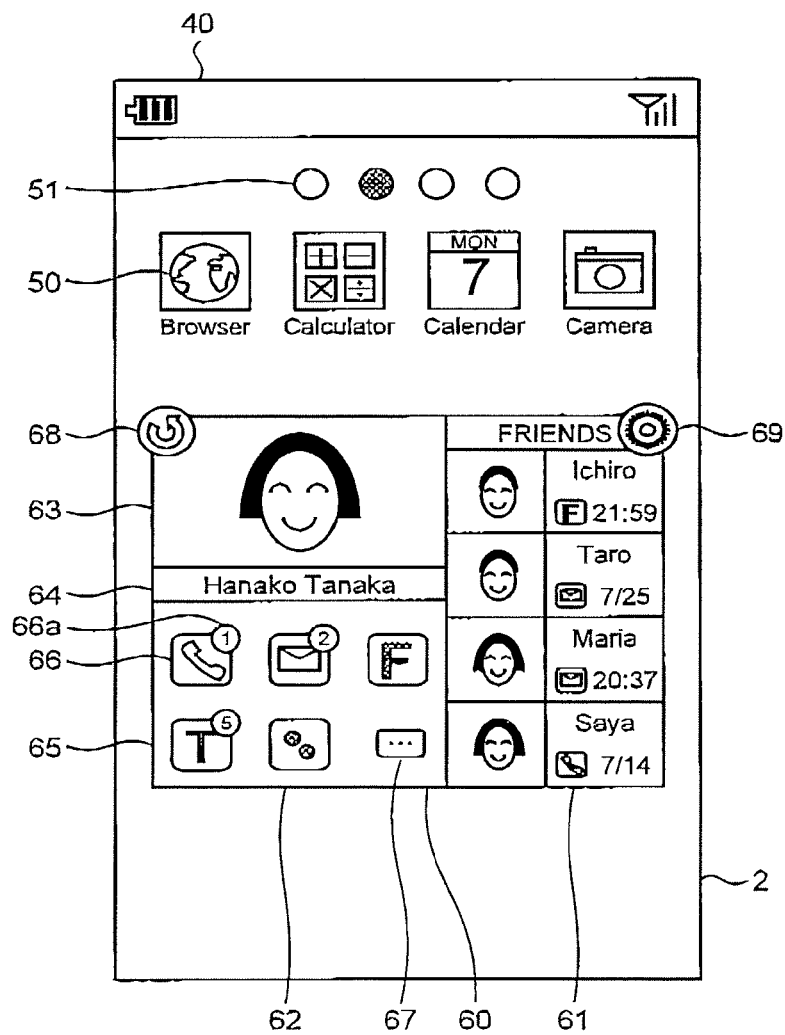
FIG. 7 is a diagram illustrating an example of group data.
FIG. 8 is a diagram illustrating an example of a contact widget.

FIG. 8 is a diagram illustrating an example of the contact widget. As illustrated in FIG. 8, a contact widget 60 displays information related to a person included in the contact data 9X. The information displayed on the contact widget 60 includes information related to communication services associated with the person in the contact data 9X.

The contact widget 60 is arranged on the home screen 40, similarly to the icons 50. In other words, when the power for the smartphone 1 is turned on and the home screen 40 is displayed on the display 2A, similarly to the icons 50, the contact widget 60 appears as part of the home screen 40 without any particular operation performed by the user. When an application executed through a tap on an icon 50 is ended and the home screen 40 is again displayed on the display 2A, similarly to the icons 50, the contact widget 60 appears as part of the home screen 40 without any particular operation performed by the user.

In this way, the contact widget 60 is displayed as part of the home screen 40. Therefore, the user can easily and quickly refer to information displayed on the contact widget 60. Moreover, as explained below, by easily and quickly performing an operation on the contact widget 60, the user can make contact with a person displayed on the contact widget 60 and can acquire information related to the person.

The contact widget 60 includes a member list area 61, a detailed information area 62, an update icon 68, and an edit icon 69. The member list area 61 displays information related to one of the groups registered in the group data 9Y. Specifically, the member list area 61 displays a group name and a member list. The member list includes profile images and names of the members included in a group, and use dates or use times of the communication service last used by the members by a predetermined number of members. The information included in the member list can be obtained from the contact data 9X.

The detailed information area 62 displays detailed information related to one person selected from among persons included in the contact data 9X. The detailed information area 62 includes a profile image area 63, a name area 64, and an icon area 65. The profile image area 63 and the name area 64 display information for specifying a selected person. Specifically, the profile image area 63 displays the profile image of a selected person. The name area 64 displays the name of a selected person. The profile image and the name of the selected person can be obtained from the contact data 9X.

The icon area 65 is an area where icons 66 indicating communication services registered in the contact data 9X in association with the selected person are arranged. Each of the icons 66 is displayed using an image previously associated with a corresponding communication service. When a value of the number of notifications set in the contact data 9X in association with the communication service corresponding to the icon 66 is greater than 0, the icon 66 is added with a numerical icon 66a indicating the value of the number of notifications.

When the number of communication services registered in the contact data 9X in association with the selected person is larger than the number of icons 66 that can be displayed in the icon area 65, a page change icon 67 is displayed in the icon area 65 as illustrated in FIG. 8. The page change icon 67 indicates the user that there are icons 66 that cannot be displayed in the icon area 65. When a tap on the page change icon 67 is detected, the smartphone 1 displays remaining icons 66 that cannot be displayed in the icon area 65 in this area.

The communication services registered in the contact data 9X in association with a selected person may be displayed in a form of list, instead of an icon, using a character string such as a name. Instead of displaying the number of notifications, a mode in which a corresponding service is displayed may be changed according to whether the number of notifications is 0.

When a tap on the update icon 68 is detected, the smartphone 1 updates the information displayed in the detailed information area 62 to the latest information related to the selected person. For example, if the number of unopened e-mails received from the selected person is increased from 2 to 3, the smartphone 1 changes the numerical icon 66a to be added to the icon 66 corresponding to the e-mail service from "2" to "3". The smartphone 1 periodically updates the numerical icon 66a added to each icon 66 according to the latest status even if the tap on the update icon 6B is not detected.

When detecting a tap on the edit icon 69, the smartphone 1 executes the process for updating the member list. The process for updating the member list will be explained later.

In this way, the contact widget 60 includes the icons 66 corresponding to the communication services registered in the contact data 9X in association with the selected person. Therefore, the user looks at the contact widget 60 and can thereby easily recognize which of the communication services the selected person uses.

Added to the icon 66 is the numerical icon 66a indicating the number of events to be notified to the user, of the events performed by the selected person in the communication service corresponding to the icon 66. Therefore, the user looks at the contact widget 60 and can thereby easily recognize how many events related to the selected person should be checked.

Figure 9:
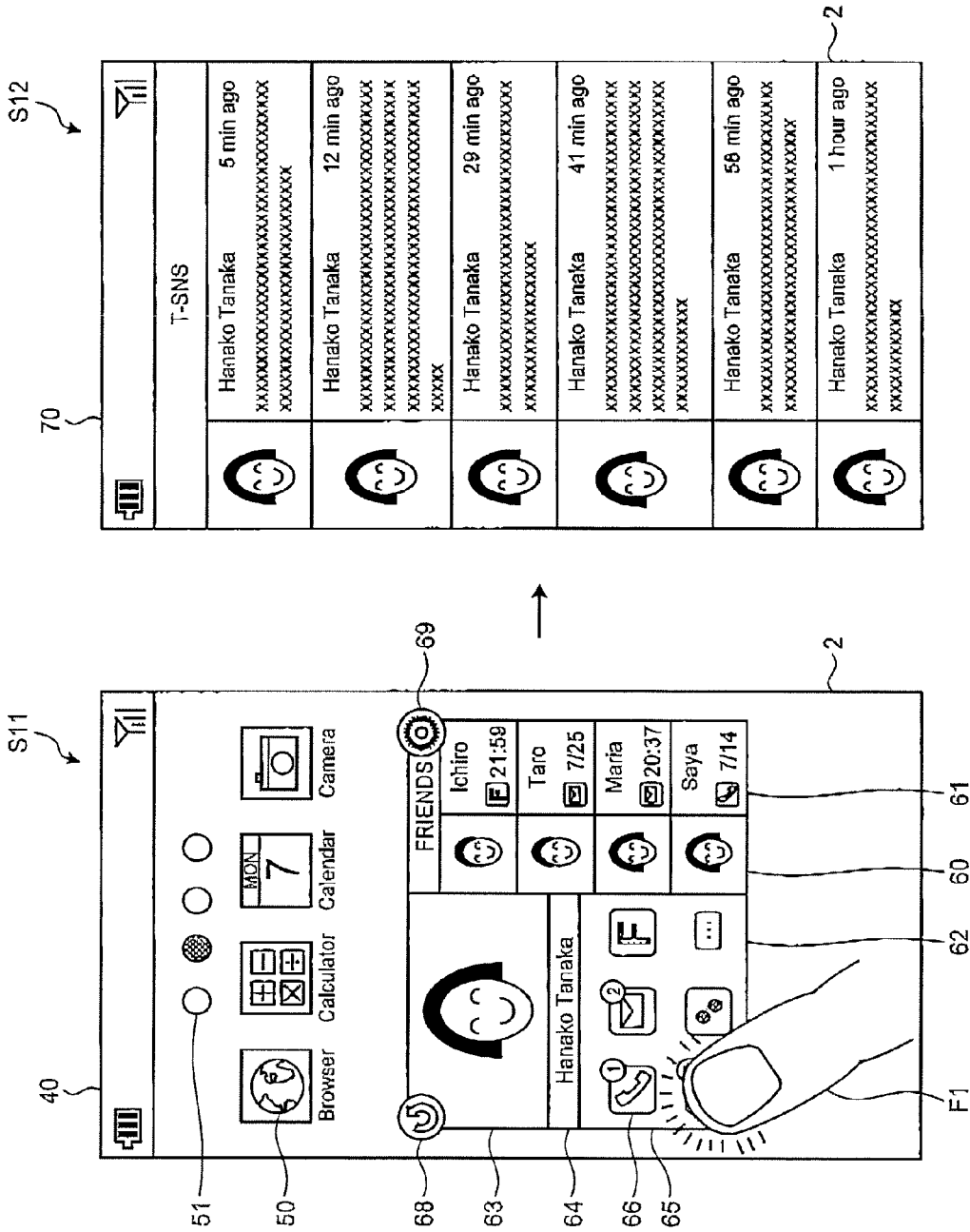
FIG. 9 is a diagram illustrating an example of using communication service through the contact widget.

The contact widget 60 is also used for using communication service. FIG. 9 is a diagram illustrating an example of using communication service through the contact widget. At Step S11 in FIG. 9, the user taps the icon 66 corresponding to SNS called "T-SNS" with the finger F1. When detecting the tap on the icon 66, the smartphone 1 executes a function for using the communication service corresponding to the tapped icon 66. In the example of FIG. 9, at Step S12, the smartphone 1 executes an application for browsing posts on SNS called "T-SNS". The executed application causes the controller 10 to execute a display process of a browsing screen 70 for displaying messages posted by the person displayed in the detailed information area 62 on the display 2A.

A gesture for using a communication service corresponding to the icon 66 may be some other gestures, instead of the tap, such as a double tap or a long tap. The case of tapping on the icon 66 corresponding to SNS is explained in FIG. 9; however, the icon 66 corresponding to the phone service and the icon 66 corresponding to the e-mail service are also used for using communication service.

When the icon 66 corresponding to the phone service is tapped, the smartphone 1 executes, for example, transmission to the person displayed in the detailed information area 62. If the numerical icon 66a is added to the icon 66 corresponding to the phone service, the smartphone 1 may prompt the user to check the event to be notified instead of executing the transmission. To prompt the user to check the event to be notified, for example, the smartphone 1 can display a call history on the display 2A or can execute an answering machine.

When the icon 66 corresponding to the e-mail service is tapped, the smartphone 1 executes the mail application 9B so that, for example, an e-mail compose screen for the person displayed in the detailed information area 62 is displayed. If the numerical icon 66a is added to the icon 66 corresponding to the e-mail service, the smartphone 1 may prompt the user to check the event to be notified instead of displaying the e-mail compose screen. To prompt the user to check the event to be notified, the smartphone 1 can execute the mail application 9B so as to display, for example, an email inbox.

In this way, when the icon 66 is tapped, the smartphone 1 executes the function for using the communication service corresponding to the tapped icon 66. Moreover, the smartphone 1 executes the function so that the process related to the person displayed in the detailed information area 62 is executed in a manner suitable for using. Therefore, the user can easily and quickly make contact with the person displayed in the detailed information area 62 or collect information related to the person.

Figure 10:
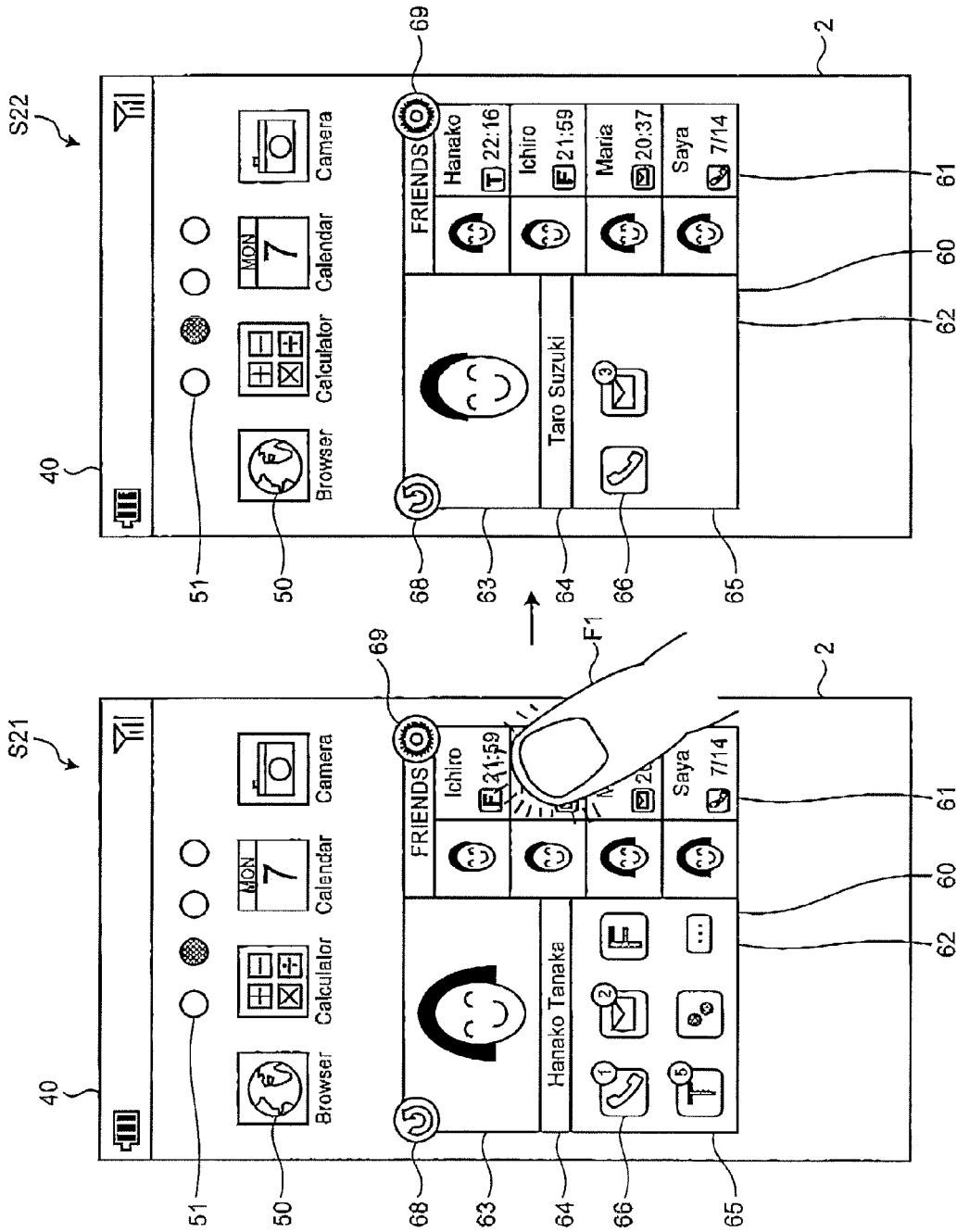
FIG. 10 is a diagram illustrating an example of how to change a person displayed in a detailed information area.

The person displayed in the detailed information area 62 can be changed. FIG. 10 is a diagram illustrating an example of how to change the person displayed in the detailed information area 62. At Step S21 in FIG. 10, the user taps one person in the member list displayed in the member list area 61 with the finger F1. When detecting the tap on the one person in the member list, the smartphone 1 updates the contact widget 60 so as to display the tapped member in the detailed information area 62. In the example of FIG. 10, at Step S22, the smartphone 1 updates the contact widget 60 so that the information for the person named "Taro Suzuki" who is the tapped member is displayed in the detailed information area 62. This person uses only two communication services, and so the number of icons 66 displayed in the icon area 65 is changed to two.

In the example of FIG. 10, it is controlled so that the person displayed in the detailed information area 62 is not displayed in the member list area 61. However, the person displayed in the detailed information area 62 may be included in the member list displayed in the member list area 61.

In this way, the smartphone 1 changes the person displayed in the detailed information area 62 based on the operation on the home screen. Therefore, the user can easily and quickly change the person displayed in the detailed information area 62.

Figure 11:
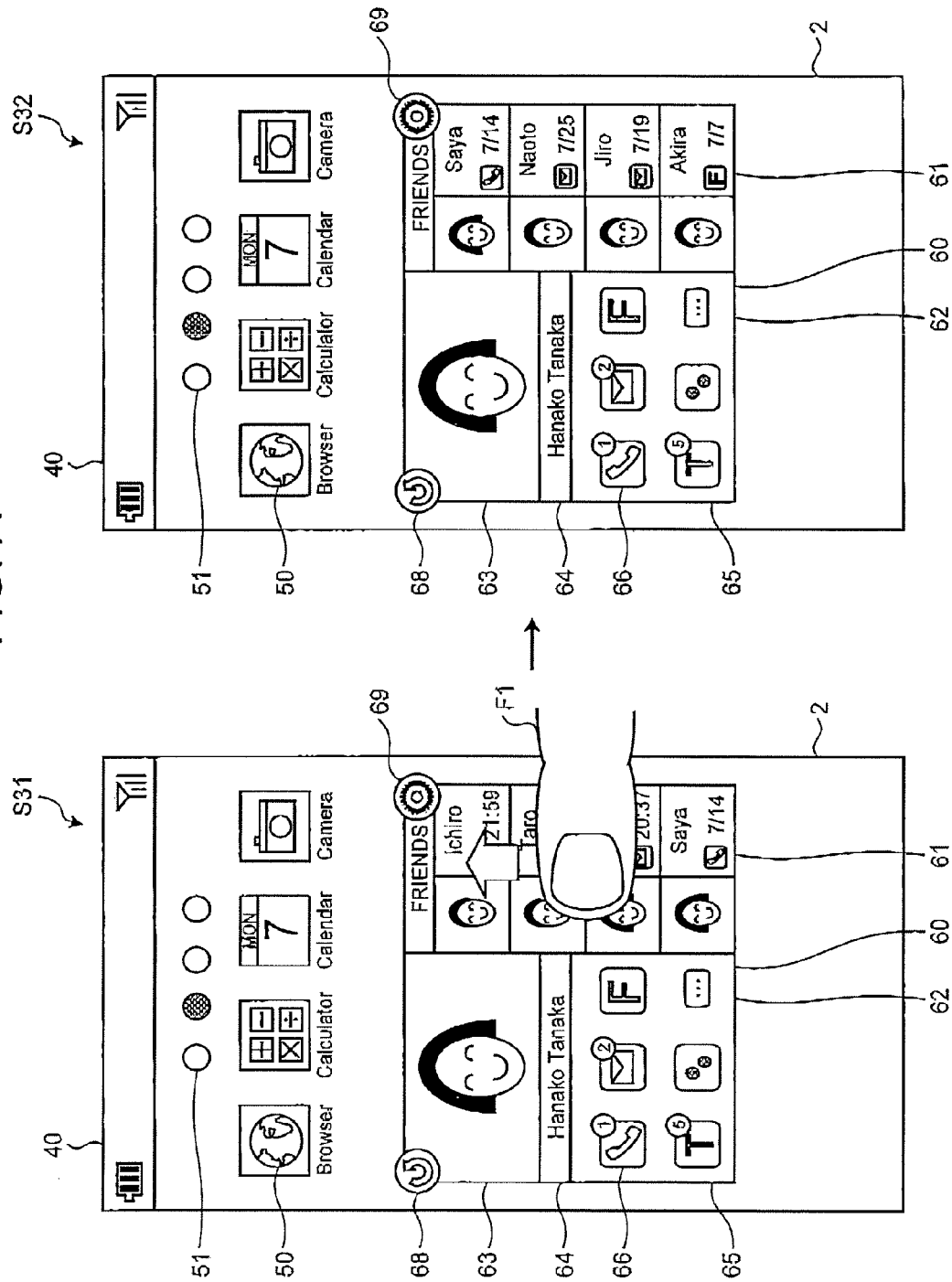
FIG. 11 is a diagram illustrating an example of scrolling a member list displayed in a member list area.

The member list displayed in the member list area 61 can be scrolled. FIG. 11 is a diagram illustrating an example of scrolling the member list displayed in the member list area 61. At Step S31 in FIG. 11, the user flicks the finger F1 upward in the member list area 61. When detecting the upward flick or downward flick in the member list area 61, the smartphone scrolls the member list displayed in the member list area 61 according to a direction of the detected flick. In the example of FIG. 11, because the upward flick is detected, at Step S32, the smartphone 1 scrolls the member list upward. The upward scroll of the member list allows the other members belonging to the same group to appear in the member list area 61.

Figure 12:
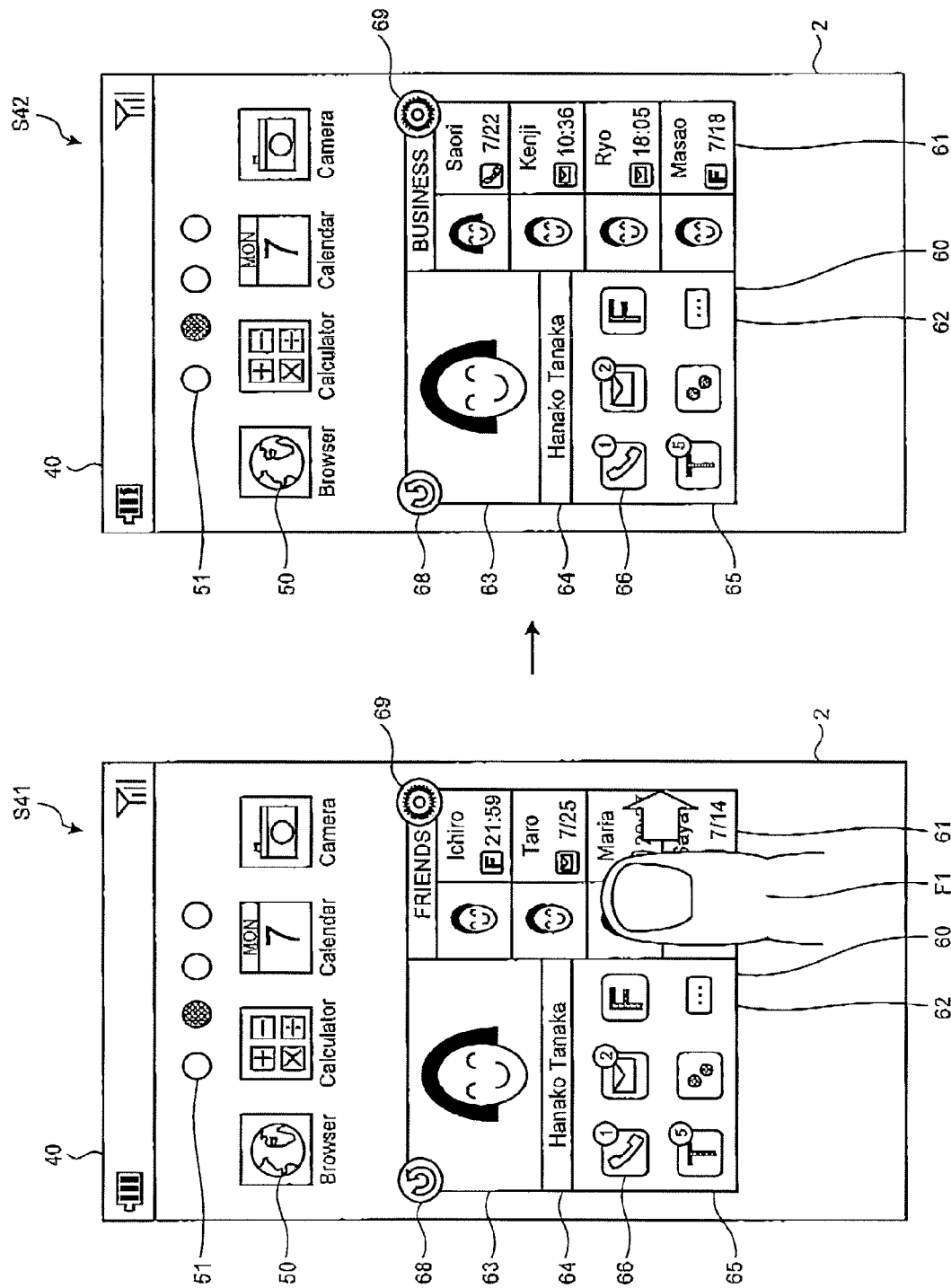
FIG. 12 is a diagram illustrating an example of how to change a group displayed in the member list area.

The group displayed in the member list area 61 can be changed. FIG. 12 is a diagram illustrating an example of how to change the group displayed in the member list area 61. At Step S41 in FIG. 12, the user flicks the finger F1 rightward in the member list area 61. When detecting the rightward flick or leftward flick in the member list area 61, the smartphone changes the group displayed in the member list area 61 according to a direction of the detected flick. In the example of FIG. 12, because the rightward flick is detected, at Step S42, the smartphone 1 changes the group displayed in the member list area 61 from a group named "Friends" to a group named "Business". The change of the displayed group allows members belonging to other group to appear in the member list area 61.

In the examples in FIG. 11 and FIG. 12, when the flick is detected in the member list area 61, the member list is scrolled or the group is changed to another; however, the same process may be performed when a swipe is detected in the member list area 61. In the examples in FIG. 11 and FIG. 12, the scrolling of the member list is assigned to the vertical flick and the changing of the group is assigned to the horizontal flick; however, a relation between a direction of a gesture and a process to be assigned thereto may be changed according to a direction in which the members included in the member list are laid out.

In this way, the smartphone 1 changes the member list displayed in the member list area 61 based on the operation on the home screen. Therefore, the user can display an arbitrary person on the contact widget 60.

Figure 13:
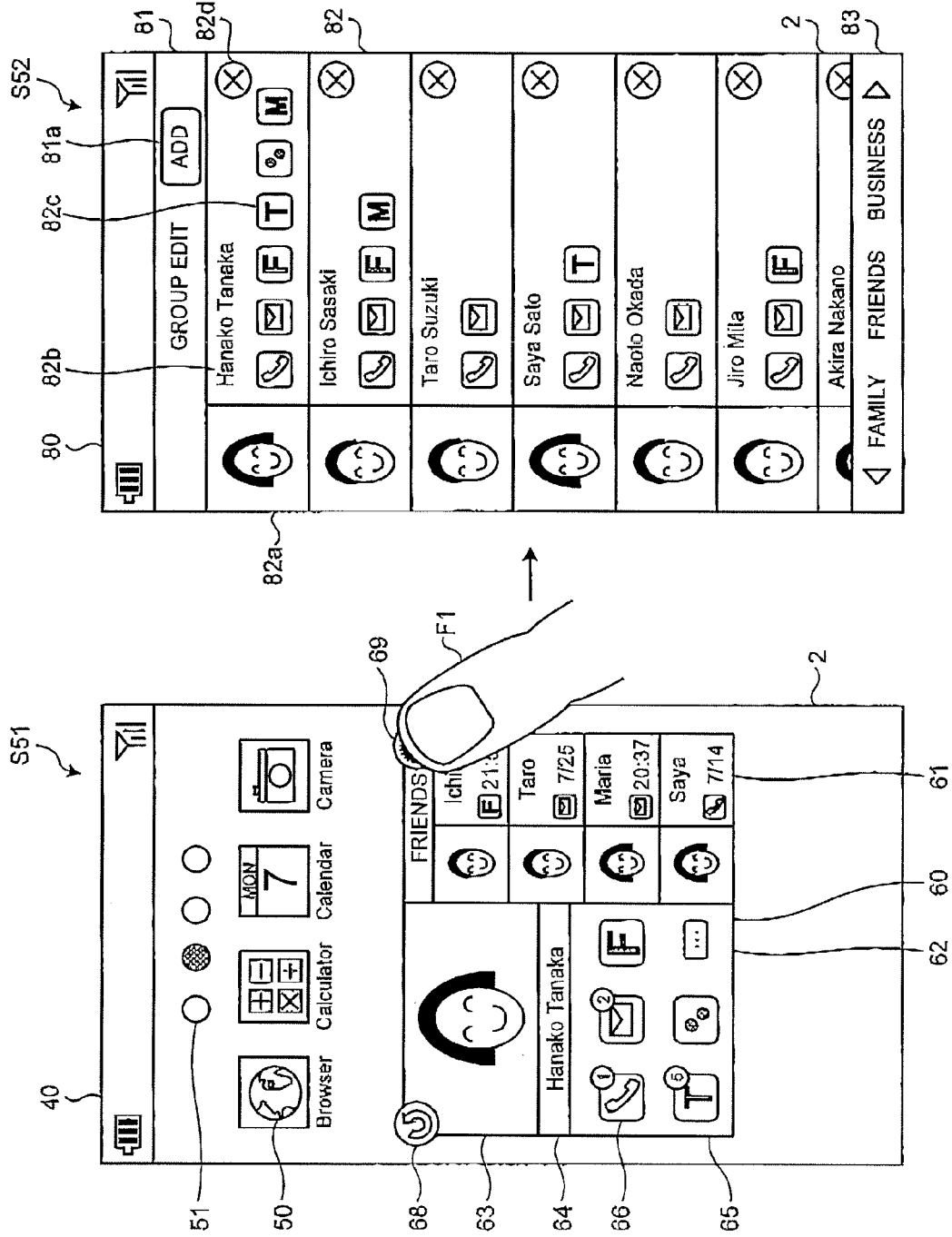
FIG. 13 is a diagram illustrating an example of an operation for editing group data.
Figure 14:
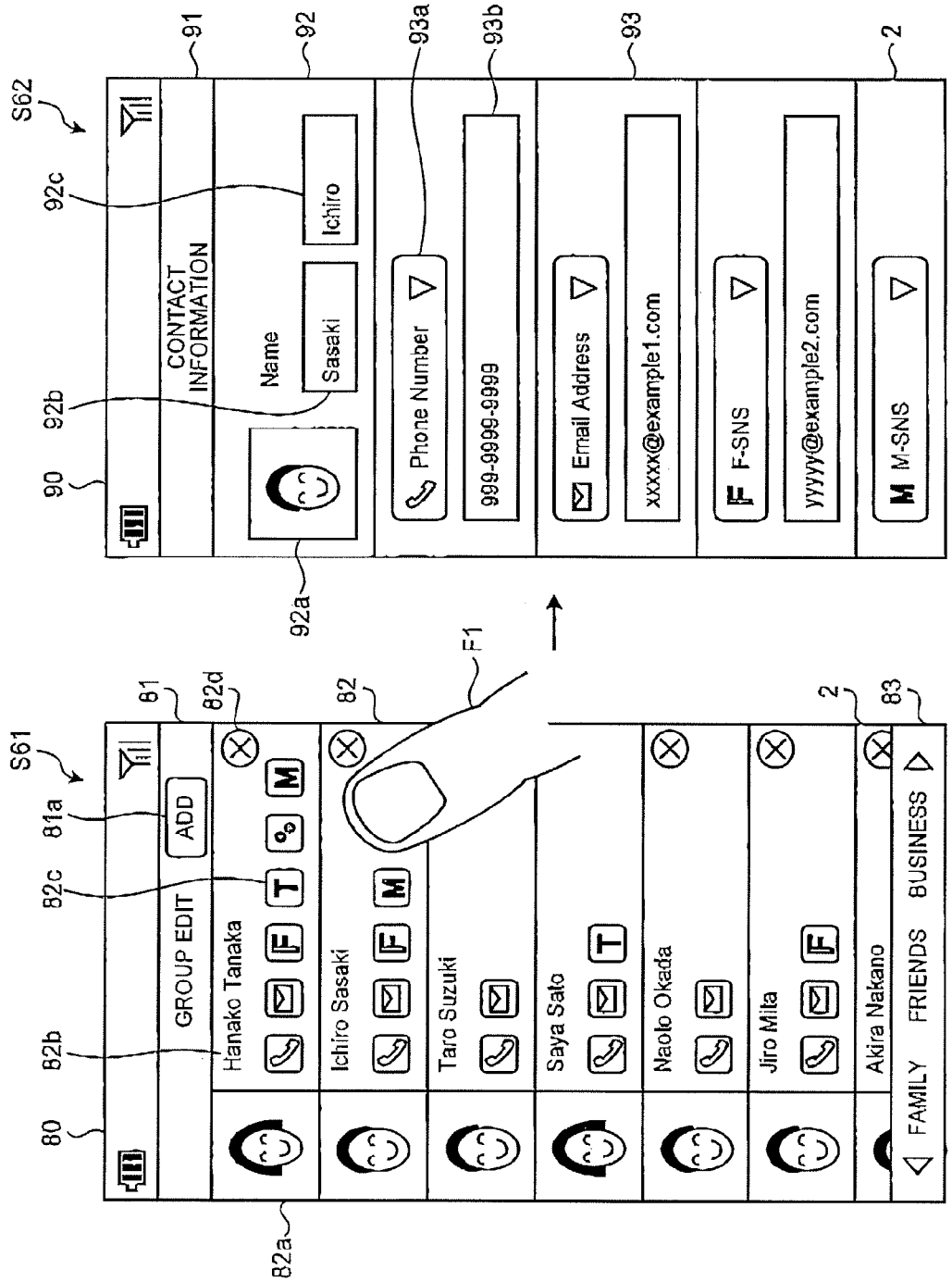
FIG. 14 is a diagram illustrating an example of an operation for editing contact data.

Moreover, the user can execute the edit function for each of the contact data 9X and the group data 9Y from the contact widget 60. FIG. 13 is a diagram illustrating an example of an operation for editing the group data 9Y. FIG. 14 is a diagram illustrating an example of an operation for editing the contact data 9X.

At Step S51 in FIG. 13, the user taps the edit icon 69 with the finger F1. When detecting the tap on the edit icon 69, at Step S52, the smartphone 1 displays a group edit screen 80 on the display 2A. The group edit screen 80 includes a header 81, a member list area 82, and a footer 83.

The header 81 includes an Add button 81a. When detecting a tap on the Add button 81a, the smartphone 1 displays a screen for selecting an arbitrary person included in the contact data 9X on the display 2A. When the person is selected on the screen, the smartphone 1 updates the group data 9Y so that the selected person is included in the group displayed in the group edit screen 80. However, one person is prohibited from belonging to the same group in a duplicated manner.

The member list area 82 displays a profile image 82a, a name 82b, an icon 82c indicating a communication service registered in the contact data 9X in association with a person, and a delete icon 82d for each member belonging to a group. When detecting a tap on the delete icon 82d, the smartphone 1 updates the group data 91 so that the person corresponding to the tapped delete icon 82d is not included in the group displayed on the group edit screen 80. In addition, the smartphone 1 deletes the member corresponding to the tapped delete icon 82d from the member list area 82.

The footer 83 displays a group name currently displayed, a group name displayed when a rightward flick is detected, and a group name displayed when a leftward flick is detected.

When detecting a flick gesture or a swipe gesture in the vertical direction in the member list area 82, the smartphone 1 scrolls the member list displayed in the member list area 82 according to the direction of the detected gesture. When a predetermined operation is detected, the smartphone may change the order of the members displayed in the member list area 82 and reflect the change of the order in the group data 9Y.

When detecting the tap in the member list area 82, the smartphone 1 displays a contact-information edit screen 90 on the display 2A. At Step S61 in FIG. 14, the user taps one of the members displayed in the member list area 82 with the finger F1. In this case, at Step S62, the smartphone 1 displays the contact-information edit screen 90 to edit information related to the tapped member. The contact-information edit screen 90 includes a header 91, a profile area 92, and a service list area 93.

The profile area 92 includes a profile-image display item 92a, a family-name input item 92b, and a given-name input item 92c. The profile-image display item 92a displays a profile image of the person corresponding to the contact-information edit screen 90. When detecting a tap on the profile-image display item 92a, the smartphone 1 displays a screen for selecting a profile image on the display 2A. The family-name input item 92b is a field for inputting a person's family name. The given-name input item 92c is a field for inputting a person's given name.

The service list area 93 displays a service selection item 93a and a service-ID input item 93b for each service. The service selection item 93a is an item for selecting a communication service used by the person from previously registered communication services. The service-ID input item 93b is a field for inputting person's Account ID in a communication service selected in the corresponding service selection item 93a. The total number of services included in the list displayed in the service list area 93 is increased or decreased according to a user's operation.

The smartphone 1 updates the information for the person registered in the contact data 9X based on the information input in the contact-information edit screen 90.

A procedure for displaying and updating the contact widget 60 will be explained below with reference to the flowchart illustrated in FIG. 15. The procedure illustrated in FIG. 15 is implemented by the controller 10 executing the contact application 9D. The procedure in FIG. 15 is executed when the home screen 40 is displayed on the display 2A. The controller 10 may execute other procedure for controlling the home screen 40 in parallel with the procedure illustrated in FIG. 15.

At Step S101, the controller 10 initializes a timer. At Step S102, the controller 10 acquires the number of notifications for each combination of the person registered in the contact data 9X with the communication service, and sets the acquired number of notifications in the contact data 9X. For example, the number of notifications for the phone service is acquired from a call history stored in the storage 9 or a provider's server. The number of notifications for the e-mail service is acquired from an inbox stored in the storage 9 or a provider's server. The number of notifications for SNS is acquired from a posting history stored in a provider's server or from a cache of a posting history stored in the storage 9.

Subsequently, at Step S103, the controller 10 displays the contact widget 60 on the home screen 40 displayed on the display 2A. Then at Step S104, the controller 10 displays the member list in the member list area 61. The member list displayed in the member list area 61 is, for example, a member list last displayed in the member list area 61. That is, each time the change operation is performed, the controller 10 may store a member list to be newly displayed in the member list area 61 in the storage 9, and, at Step S104, the controller 10 may display the member list stored in the storage 9 in the member list area 61.

At Step S105, the controller 10 selects a person to be displayed in the detailed information area 62 from among the persons registered in the contact data 9X. The person to be displayed is, for example, the person last displayed in the detailed information area 62. That is, the controller 10 may store a person to be newly displayed in the detailed information area 62 in the storage 9 each time the change operation is performed, and, at Step. S105, the controller 10 may select the person stored in the storage 9 as a person to be displayed.

Alternatively, the controller 10 may select the person most notable for the user as a person to be displayed in the detailed information area 62. For example, the controller 10 may select a person with the largest total value of values set in the item of Notifications in the contact data 9X as a person to be displayed. The controller 10 may also select a person with the latest value set in the item of Last use data/time in the contact data 9X as a person to be displayed.

At Step S106, the controller 10 acquires information for the selected person from the contact data 9X, and displays the acquired information in the detailed information area 62. If the number of notifications for the communication service registered in the contact data 9X associated with the selected person is greater than 0, the controller 10 adds the numerical icon 66a indicating the number of notifications to the icon 66 corresponding to the communication service.

Subsequently, at Step S107, the controller 10 determines whether a gesture on the contact widget 60 has been detected through the touch screen 2B. When the gesture on the contact widget 60 has been detected (Yes at Step S107), then at Step S108, the controller 10 executes the process according to the detected gesture. The controller 10 executes, for example, the process represented in any of FIG. 8 to FIG. 13 according to the detected gesture. When the gesture on the contact widget 60 has not been detected (No at Step S107), then Step S108 is omitted.

Subsequently, at Step S109, the controller 10 determines whether a predetermined time has elapsed based on the timer. When the predetermined time has elapsed (Yes at Step S109), then at Step S110, the controller 10 resets the timer. At Step S111, similarly to Step S102, the controller 10 acquires the number of notifications for each combination of the person registered in the contact data 9X with the communication service, and sets the acquired number of notifications in the contact data 9X. At Step S112, the controller 10 updates the numerical icon 66a to be added to the icon 66 based on the number of notifications set in the contact data 9X. When the predetermined time has not elapsed (No at Step S109), then Step S110 to Step S112 are omitted.

Subsequently, at Step S113, the controller 10 determines whether the process should be completed. For example, when a predetermined operation to delete the contact widget 60 is performed on the home screen 40 or when a predetermined operation to turn off the power for the smartphone 1 or to restart the smartphone 1 is performed, the controller 10 determines that the process should be completed. When it is determined that the process should be completed (Yes at Step S113), the controller 10 ends the procedure illustrated in FIG. 15. When it is determined that the process should not be completed (No at Step S113), the controller 10 re-executes Step S107 and the subsequent steps.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display configured to display a home screen; and
a controller configured to
display a profile image specifying a person in the home screen,
display a list of icons specifying communication services used by the specified person specified in the home screen, wherein the profile image and the icons are concurrently displayed on the home screen,
display, on at least one of the icons, a number of events to be notified, among events performed by the specified person using the communication services, and
when the touch screen display detects an operation operated on an icon among the icons,
execute a first function in a case where the number of events to be notified is displayed on said operated icon, and
execute a second function in a case where the number of events to be notified is not displayed on said operated icon, wherein the second function is different from the first function.

2. The device according to claim 1, wherein
when an operation for selecting one of the communication services is detected, the controller is configured to execute a function for using the selected service.

3. The device according to claim 1, wherein
the specified person is a person other than a user of the device,
the list includes only icons corresponding to the communication services used by the specified person, and
the controller is further configured to, when a specific operation is detected on the profile image or on an icon in the list, update the numbers of events to be notified on all of the icons corresponding to the specified person.

4. The device according to claim 1, wherein
the controller is further configured to display
a list of profile images, and
in association with each of the profile images, a corresponding list of icons, and
the list of profile images and the corresponding lists of icons are concurrently displayed on the home screen.

5. The device according to claim 1, wherein the controller is configured to display, on the home screen and concurrently with the profile image and the list of icons,
  further profile images each specifying a corresponding further person among a plurality of further persons, wherein
    a size of each of the further profile images displayed on the home screen is smaller than a size of the profile image displayed on the home screen, and
    each of the further profile images is associated with a corresponding further list of icons specifying communication services used by the corresponding further person, and
  for each of the further profile images displayed on the home screen, only one icon in the corresponding further list of icons.

6. The device according to claim 1, wherein
the controller is configured to
  when the operated icon corresponds to a phone service,
    execute a function which prompts a user of the device to check the events to be notified, in a case where the number of events to be notified is displayed on the operated icon, and
    execute the phone service, in a case where the number of events to be notified is not displayed on the operated icon.

7. The device according to claim 6, wherein
the function, which prompts the user to check the events to be notified, includes at least one of
  a function which displays a call history on the touch screen display, and
  a function which executes an answering machine.

8. The device according to claim 1, wherein
the controller is configured to
  when the operated icon corresponds to an e-mail service,
    execute a function which prompts a user of the device to check the events to be notified, in a case where the number of events to be notified is displayed on the operated icon, and
    execute a mail application of the e-mail service, in a case where the number of events to be notified is not displayed on the operated icon.

9. The device according to claim 8, wherein
the function, which prompts the user to check the event to be notified, includes a function which displays an email inbox on the touch screen display.

10. The device according to claim 1,
wherein the controller is configured to
  display further profile images each specifying one of a plurality of persons, and
  display, when an operation of selecting one of the plurality of persons as the specified person is detected, the profile image and the icons corresponding to the specified person.

11. The device according to claim 10, wherein
the controller is configured to change the number of the icons in the list according to the specified person selected from the further profile images.

12. The device according to claim 10, wherein the profile image, the icons corresponding to the profile image, and the further profile images are concurrently displayed on the home screen.

13. The device according to claim 10, wherein
  the controller is further configured to display a single further icon associated with each of the further profile images, and
  the further icon is concurrently displayed on the home screen with the profile image, the icons corresponding to the profile image, and the further profile images.

14. The device according to claim 13, wherein the further icon corresponds to the communication service last used by a person associated with the corresponding further profile image.

15. A method for controlling a device including a touch screen display, the method comprising:
  displaying a home screen on the touch screen display;
  displaying a profile image specifying a person in the home screen;
  displaying a list of icons specifying communication services used by the specified person specified in the home screen, wherein the profile image and the icons are concurrently displayed on the home screen;
  displaying, on at least one of the icons, a number of events to be notified, among events performed by the specified person using the communication services; and
  when the touch screen display detects an operation operated on an icon among the icons,
    executing a first function in a case where the number of events to be notified is displayed on said operated icon, and
    executing a second function in a case where the number of events to be notified is not displayed on said operated icon, wherein the second function is different from the first function.

16. A non-transitory storage medium storing therein a program for causing, when executed by a device including a touch screen display, the device to execute:
  displaying a home screen on the touch screen display;
  displaying a profile image specifying a person in the home screen;
  displaying a list of icons specifying communication services used by the specified person specified in the home screen, wherein the profile image and the icons are concurrently displayed on the home screen;
  displaying, on at least one of the icons, a number of events to be notified, among events performed by the specified person using the communication services; and
  when the touch screen display detects an operation operated on an icon among the icons,
    executing a first function in a case where the number of events to be notified is displayed on said operated icon, and
    executing a second function in a case where the number of events to be notified is not displayed on said operated icon, wherein the second function is different from the first function.

* * * * *